United States Patent [19]

Keijzer et al.

[11] 4,067,558
[45] Jan. 10, 1978

[54] VEHICLE SUSPENSION STRUT

[75] Inventors: Johan H. Keijzer, Hasselt; Louis J. Jossa, Sint-Truiden; Henri C. J. Vanhove, Gelmen, all of Belgium

[73] Assignee: Monroe Belgium N.V., Sint-Truiden, Belgium

[21] Appl. No.: 642,789

[22] Filed: Dec. 22, 1975

Related U.S. Application Data

[63] Continuation of Ser. No. 501,978, Aug. 30, 1974.

[51] Int. Cl.² .............................................. F16F 5/00
[52] U.S. Cl. .................................. 267/34; 267/64 R; 267/65 R; 267/8 R
[58] Field of Search ............. 267/8 R, 34, 65 R, 65 B, 267/64 B; 280/668, 696, 716

[56] References Cited

U.S. PATENT DOCUMENTS

| | | | |
|---|---|---|---|
| 3,031,180 | 4/1962 | Sprgay | 267/34 |
| 3,149,829 | 9/1964 | Baum | 267/34 |
| 3,376,032 | 4/1968 | Schmid | 267/8 R |
| 3,727,940 | 4/1973 | Hug | 267/34 |
| 3,870,286 | 3/1975 | Willich | 267/64 R |

Primary Examiner—James B. Marbert
Attorney, Agent, or Firm—Harness, Dickey & Pierce

[57] ABSTRACT

A vehicle suspension strut for use in a vehicle suspension system for vehicles having sprung and unsprung portions, the strut including a telescopic shock absorbing device having a cylinder and a reciprocal piston rod, means for securing one end of the clyinder to one of the vehicle portions and for securing one end of the piston rod to the other of the vehicle portions, a conversion assembly for selectively converting the strut such that it is adjustable in response to the supply of a pressurized fluid, the assembly comprising an elongated generally tubular flexible diaphragm member and first and second attachment means adapted to be removably connected to the shock absorber so as to define therewith a variable volume gas chamber, and means for selectively communicating a pressurized gas, such as compressed air, to and from the chamber to effect selectively expansion and contraction thereof.

40 Claims, 5 Drawing Figures

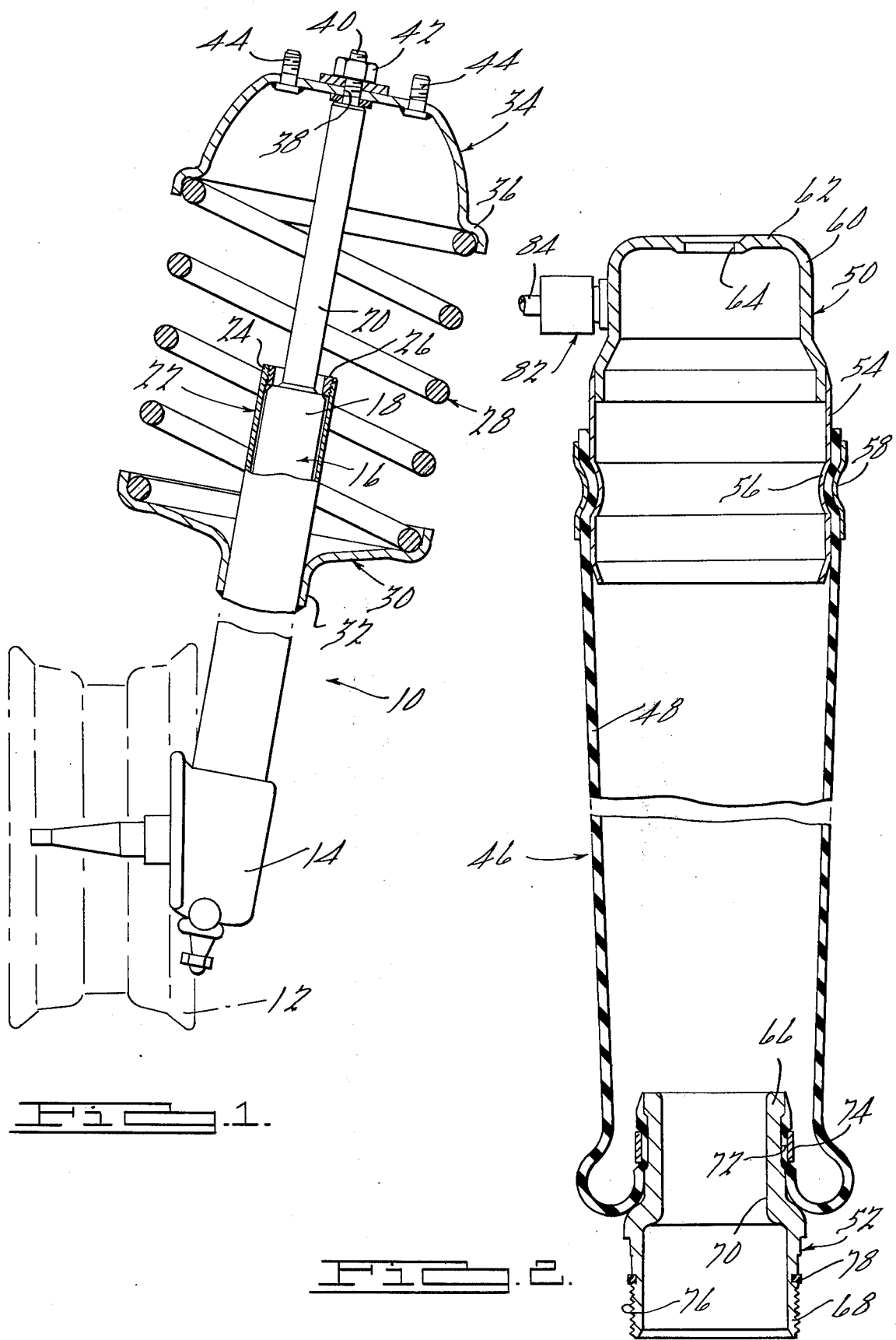

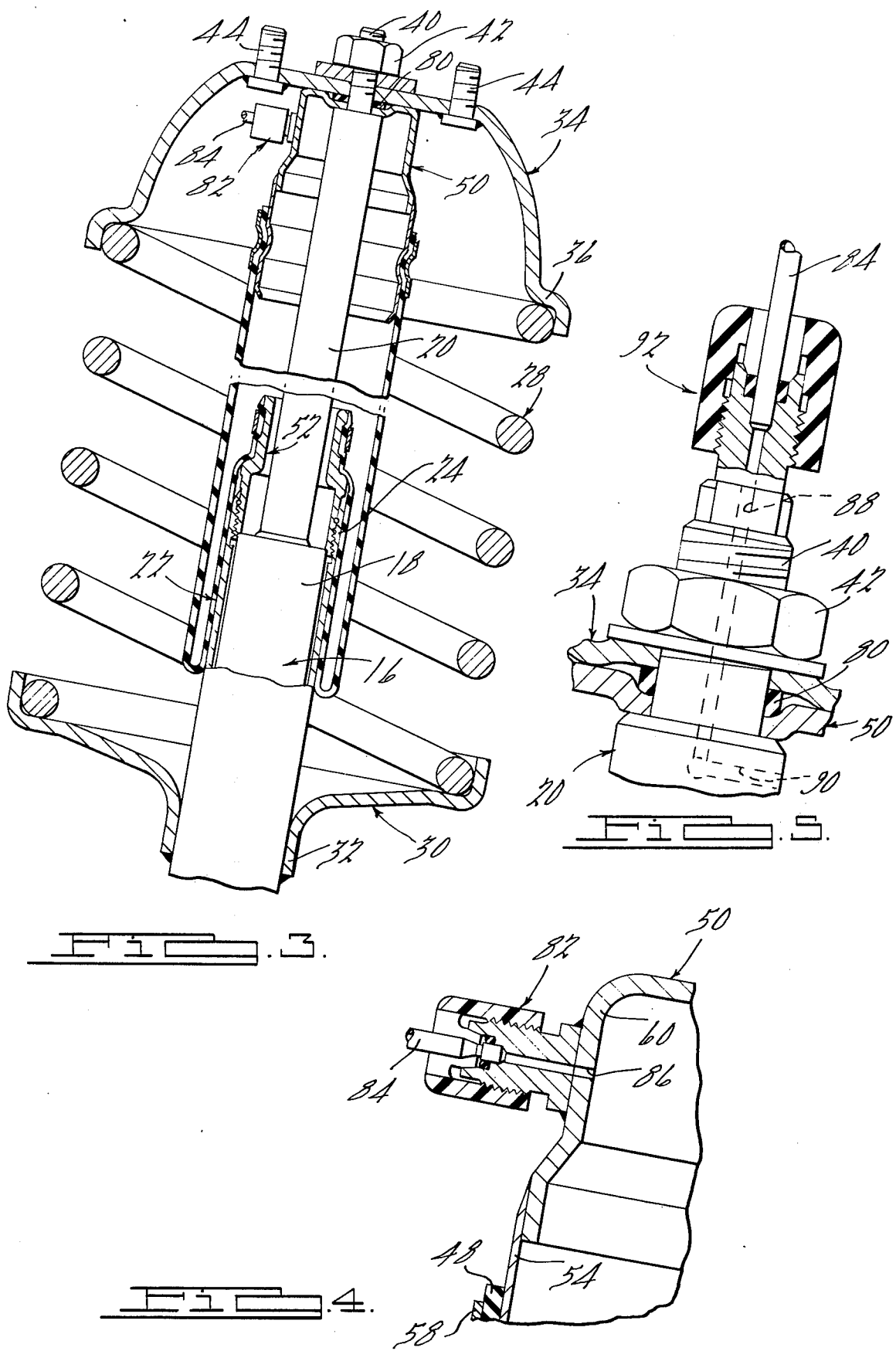

VEHICLE SUSPENSION STRUT

This is a continuation, of application Ser. No. 501,978 filed Aug. 30, 1974.

SUMMARY OF THE INVENTION

The present invention relates generally to vehicular wheel suspensions and, more particularly, to a new and improved wheel suspension which is adapted to be selectively converted from a conventional shock absorber type suspension to one in which the associated suspension spring may be augmented by means of a variable volume pressurized gas chamber.

The myriad of advantages of load leveling type wheel suspension units are well known to those skilled in the art; however, the problems of cost, inventory, maintenance and replacement are equally as well known. Additionally, it has heretofore been in the practice in the prior art when it is desired to convert a conventional wheel suspension to one which incorporates air adjustable characteristics to completely substitute an air adjustable type suspension unit for the original equipment in the vehicle. This, of course, has resulted in excessive expenditures, particularly when the original equipment has had at least some useful life left at the time of the conversion.

The present invention provides a new and improved wheel suspension design wherein the conventional suspension unit may be converted to an air leveling or air adjustable type suspension without requiring the discarding of the original shock absorber and/or related components. Accordingly, the converted wheel suspension incorporates virtually all of the original components, which components are supplemented with a rolling type diaphragm element that cooperates with the original components in defining a variable volume air chamber which can be selectively supplied with compressed air or some other suitable fluid to provide for the load adjustable characteristics. The principles of the present invention permit wide and varied use of the conversion assembly, whereby various types of wheel suspensions can be conveniently converted without requiring excessive reworking, rebuilding or other modification of the original suspension units, thereby providing for universality of application at a minimum of cost, as will hereinafter be described in detail.

It is accordingly a general object of the present invention to provide a new and improved wheel suspension for automotive vehicles and the like.

It is a more particular object of the present invention to provide a new and improved wheel suspension that may be conveniently converted to an air adjustable type suspension without any rebuilding or other structural modification of the existing wheel suspension.

It is still another object of the present invention to provide a new and improved wheel suspension of the above described type which may be communicable with a suitable source of pressurized gas in a variety of different ways, thereby providing for universality of installation.

It is yet another object of the present invention to provide a new and improved wheel suspension of the above described character which may be converted to an air adjustable type as original equipment or as a convenient after-marked type option.

It is still another object of the present invention to provide a new and improved wheel suspension of relatively simple design, that is economical to manufacture and which will have a long and effective operational life.

Other objects and advantages of the present invention will become apparent from the following detailed description taken in conjunction with the accompanying drawings.

BRIEF DESCRIPTION OF THE DRAWINGS

FIG. 1 is a side elevational view, partially broken away, of a vehicle wheel suspension associated;

FIG. 2 is a longitudinal cross sectional view of a wheel supsension conversion assembly in accordance with the principles of the present invention;

FIG. 3 is a view similar to FIG 1, with the wheel suspension having the conversion assembly of FIG. 2 in operative association therewith;

FIG. 4 is an enlarged fragmentary cross sectional view of a portion of the structure shown in FIG. 3; and FIG. 5 is a longitudinal cross sectional view of an alternate embodiment of the present invention.

DESCRIPTION OF THE PREFERRED EMBODIMENTS

Referring now in detail to the drawing and in particular to FIG. 1 thereof, a vehicle wheel suspension is generally designated by the numeral 10 and is shown in operative association with a typical vehicle wheel 12 which is mounted in a conventional manner upon a wheel spindle 14. The wheel suspension 10 is depicted as being of the independent McPherson type, although it will be appreciated that the principles of the present invention are not necessarily limited to such type of suspension. The wheel suspension 10 is provided with a telescopic shock absorber 16 of a conventional type and including a body or cylinder 18 having a piston rod 20 reciprocally mounted therewithin and extending upwardly from the upper end thereof. As will be appreciated by those skilled in the art, the inner end of the piston rod 20 is connected to a valved piston which functions in cooperation with a quantity of hydraulic damping fluid within the cylinder 18 to damp reciprocal movement of the piston rod 20 relative to the cylinder 18. The shock absorber 16 is operatively disposed within an elongated tubular housing 22, the lower end of which is secured in any suitable manner to the wheel spindle 14 and the upper end of which is provided with an internal threaded portion 24. Retaining means in the form of a suitable ring nut or the like 26 is threadably received within the upper end of the cylinder 18 and functions to operatively secure the shock absorber 16 within the housing 22. It will be appreciated that the shock absorber 16 may be of the cartridge type, whereby to provide for convenient replacement thereof within the housing 22 for purposes of repair, replacement or the like.

The shock absorber is shown in operative association with a helical suspension spring 28 which extends generally coaxially around the outer periphery of the shock absorber 16 and piston rod 20, as illustrated. The lower end of the spring 28 is operatively supported upon a lower spring seat 30 having an inner peripheral portion 32 which is secured, as by welding or the like, to the outer periphery of the tubular housing 22. The upper end of the suspension spring 28 is supported by means of an upper spring seat 34 having a peripheral shoulder 36 against which the spring 28 bears. The upper spring seat 34 is formed with a central bore 38 through which a reduced diameter portion 40 of the piston rod 29 extends. The piston rod portion 40 is typically externally threaded and is adapted to threadably receive a suitable retaining nut or the like 42 for securing the rod 20 to the spring seat or adjacent vehicle suspension component in a manner well known in the art. Suitable fastening means in the form of screws, bolts or the like 44 may be typically provided on the spring seat 34 for operatively securing the same to the sprung portion of the vehicle.

In accordance with the principles of the present invention, the wheel suspension 10 is adapted to be selectively converted or transformed from a single vehicle suspension unit as shown in FIG. 1 to a supension system having load compensating ability. More particularly, the wheel suspension 10 is adapted to be operatively associated with a conversion assembly best shown in FIG. 2 and generally designated by the numeral 46. The assembly 46 includes an elongated generally tubular shaped rolling diaphragm fabricated, for example, of a suitable natural or synthetic rubber-like material which may, if desired, be reinforced by suitable fabric or the like. The assembly 46 also includes upper and lower attachment fittings 50 and 52, respectively, which are utilized in operatively securing the assembly 46 to the wheel suspension 10. More particularly, the upper attachment fitting 50 includes a generally shaped section 54 that is formed with an annular radially inwardly extending groove 56 which cooperates with a clamping ring 58 in fixedly securing the upper end of the rolling diaphragm 48 to the upper attachment fitting 50. The fitting 50 further comprises a generally cup-shaped upper section 60 having a radially disposed end portion 62 within which is formed a central opening 64 that functions in a manner hereinafter to be described.

The lower attachment fitting 52 comprises first and second axially displaced integral sections 66 and 68 which together form a central bore or passage 70. The section 66 is formed with a radially inwardly disposed annular groove or recess 72 that cooperates with an annular clamping ring 74 in securing the lower end of the rolling diaphragm 48 to the lower attachment fitting 52, as illustrated. The section 68 of the fitting 52 is selected so as to have an outer diameter approximately equal to the inner diameter of the upper end portion 24 of the housing 22, with the section 68 having an externally threaded portion 76 adapted to be threadably received within the end portion 24 of the housing 22. Means in the form of a suitable O-ring sealing element or the like 78 is provided around the outer periphery of the section 68 and functions to cooperate with the housing 22 in a manner hereinafter to be described. It will be appreciated, of course, that while the housing 22 and lower attachment fitting 52 are respectively formed with interiorly disposed and exteriorly disposed complementary threads, it is contemplated that in certain applications, just the opposite may be true with the fitting 52 being threadably secured to the exterior as opposed to the interior of the housing 22. Of course, various other types of securing means may be provided for operatively securing the lower attachment fitting 52 to the housing 22 without departing from the scope of the present invention.

In order to effect installation of the conversion assembly 46 embodying the principles of the present invention, the piston rod 20 is initially disconnected from the upper spring seat 34 by disconnecting the threaded nut 42 from the upper end portion 40 of the piston rod 20. Additionally, the ring nut or the like 36 is disconnected from within the upper threaded end section 24 of the tubular housing 22. Thereafter, the lower attachment fitting 52 is threadably received within the upper end portion 24 of the housing 22 and the rolling diaphragm 48 is reversely folded in a manner shown in FIG. 3, whereupon the upper attachment fitting 50 may be located adjacent the upper end of the piston rod 20 such that the reduced diameter end portion 40 thereof extends through the central opening 64 in the fitting 50. Suitable sealing means, such as an O-ring or the like 80, is preferably provided between the upper side of the upper attachment fitting 50 and the underside of the spring seat 34 so that a fluid tight seal is provided at the upper side of the upper attachment fitting 50. The reduced diameter end portion 40 of the piston rod 20 is then reinserted though the opening 64 of the fitting 50 and the nut 42 is reapplied thereto. It will thus be seen that the conversion assembly 46 forms with the exterior of the housing 22 and piston rod 20 a variable volume chamber which may be selectively charged with a pressurized fluid, such as a compressed gas, for example, compressed air from a suitable air compressor associated with the vehicle, and thus function to augment the operation of the suspension spring 28 in supporting the sprung portion of the associated vehicle during varying loaded conditions.

Pressurized gas, such as compressed air or the like, may be supplied to the variable volume chamber provided by the conversion assembly 46 by any one of a variety of different types of means, one of which is shown in FIGS. 2 through 4 wherein a fluid fitting assembly 82 is shown as being fixedly mounted to the outer side of the cup-shaped section 60 of the upper attachment fitting 50. The assembly 82 is adapted to connect or communicate a suitable compressed air conduit 84 with a passage or port 86 formed in the fitting 50, whereby compressed air supplied to the conduit 84 from the aforementioned air compressor or the like will be transferred interiorly of the chamber defined by the conversion assembly 46. FIG. 5 illustrates an alternative construction wherein the upper end of the piston rod 20 is formed with an axially extending bore 88, the lower end of which is communicable with a cross bore 90 which is communicable with the interior of the upper attachment 50 and hence with the interior of the internal variable volume defined by the assembly 46. The upper end of the piston rod 20 in FIG. 5 may be provided with a suitable fluid fitting or the like 92 which functions to communicate a suitable supply conduit, such as the afromentioned couduit 84, to the piston rod 20. It will be appreciated, of course, that various other types of connecting means may be provided for supplying compressed air or some other suitable fluid media to the interior of the conversion assembly 46 without departing from the scope of the present invention.

It will be seen from the foregoing description that the present invention provides a new and improved wheel suspension 10 which permits rapid conversion from a simple shock absorber type suspension to one which utilizes an air adjustable or other pressurized media type suspension, thereby permitting after market conversion of a wheel suspension to an air adjustable type without requiring major replacement and/or rebuilding thereof. By virtue of the unique design of the conversion assembly 46 hereinabove described, no major reworking, or retooling or extensive inventory costs are involved in effecting conversion to an air adjustable type suspenion unit in accordance with the teachings of the present invention. Accordingly, the teachings of the present invention may be practiced at a minimum of cost, yet provide a wheel suspension which exhibits all of the desirable attributes of an air adjustable suspension unit. Moreover, by virtue of the fact that the various attachment fittings associated with the conversion assembly 46 may be manufactured in a variety of different sizes and styles, the present invention will find universality of application with a myriad of different types of wheel suspension presently being used.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

We claim:

1. In combination in a suspension system for vehicles having sprung and unsprung portions comprising,
   at least one suspension strut including a telescopic shock absorbing device having a cylinder with a reciprocal piston rod projecting from one end thereof,
   means for securing one end of said cylinder to one of the vehicle portions and for securing one end of said piston rod to the other of said vehicle portions,
   a conversion assembly for selectively converting said strut such that it is adjustable in response to pressurized fluid,
   said assembly comprising an elongated generally tubular flexible diaphragm member in part defining a variable volume gas chamber and including first and second attachment means,
   said first attachment means comprising a portion adapted to be detachably connected adjacent said one end of said cylinder of said shock absorbing device and said second attachment means being of a generally cup-shaped configuration and adapted to at least partially nestingly receive said first attachment means, said second attachment means comprising a portion adapted to be detachably connected adjacent said piston rod, whereby said diaphragm member may be removed and replaced without having to subject the strut to any significant disassembly or reconstruction operations, and
   means for selectively communicating pressurized gas to and from said chamber to effect expansion and contraction thereof.

2. The invention as set forth in claim 1 wherein said suspension strut is an independent wheel suspension strut.

3. The invention as set forth in claim 1 which includes an elongated tubular housing adapted to telescopically receive said cylinder of said shock absorbing device.

4. The invention as set forth in claim 1 which includes a helical suspension spring extending generally coaxially of said shock absorbing device, and which includes first and second spring seats secured one to said shock absorbing device and the other adjacent said projecting piston rod for engaging and supporting said spring.

5. The invention as set forth in claim 1 wherein said suspension strut is a MacPherson-type strut.

6. The invention as set forth in claim 1 wherein said portion of said second attachment means is connectable to said piston rod.

7. The invention as set forth in claim 1 wherein said diaphragm is of a generally cylindrical configuration.

8. The invention as set forth in claim 1 wherein the vehicle for which said suspension strut is adapted for comprises an automotive vehicle having four rod engaging wheels.

9. The invention as set forth in claim 1 where upon assembly of said diaphragm onto said shock absorber, said lower end of said diaphram is inversely folded into the interior of said diaphragm.

10. The invention as set forth in claim 1 wherein said shock absorber is disposed within a tubular enclosure and one end of said diaphragm is attached to said enclosure.

11. A conversion assembly for use with a suspension strut having first and second attachment areas and including a telescopic shock absorber having a cylinder and a reciprocal piston rod,
    said assembly comprising an elongated generally tubular flexible diaphragm member and first and second attachment fittings adapted to be mounted adjacent the opposite ends thereof for fixedly securing one end of said diaphragm member to said first attachment area and the second opposite end of said member to said second attachment area,
    said attachment fittings being detachably connectable to said areas of said strut whereby said diaphragm defines a variable volume gas chamber with said shock absorber and may be removed and replaced without having to subject the shock absorber to any significant disassembly or reconstruction operations, one of said attachment fittings including first and second threaded members adapted to be threadably engaged for securing the associated end of said diaphragm to said strut, and
    means for selectively communicating pressurized gas to and from said chamber to effect expansion and contraction thereof.

12. The invention as set forth in claim 11 wherein said suspension strut is an independent wheel suspension strut.

13. The invention as set forth in claim 11 which includes an elongated tubular housing adapted to nestingly receive said cylinder of said shock absorber.

14. The invention as set forth in claim 11 which includes a helical suspension spring extending generally coaxially of said shock absorber, and which includes first and second spring seats for engaging and supporting said spring.

15. The invention as set forth in claim 11 wherein said suspension strut is a MacPherson-type strut.

16. The invention as set forth in claim 11 wherein said second attachment fitting is connectable to said piston rod.

17. The invention as set forth in claim 11 wherein said diaphragm is of a generally cylindrical configuration.

18. The invention as set forth in claim 11 wherein the vehicle for which said suspension strut is adapted for comprises an automotive vehicle having four rod engaging wheels.

19. The invention as set forth in claim 11 where upon assembly of said diaphragm onto said shock absorber, said lower end of said diaphragm is inversely folded into the interior of said diaphragm.

20. The invention as set forth in claim 11 wherein said one attachment fitting is operable to secure one end of said diaphragm to said shock absorber.

21. The invention as set forth in claim 11 wherein said shock absorber is disposed with a tubular enclosure and one end of said diaphragm is attached to said enclosure.

22. In combination in a suspension device for vehicles having sprung and unspring portions comprising, at least one suspension assembly including a telescopic shock absorbing device having a cylinder and a reciprocal piston rod,
means for securing one end of said cylinder to one of the vehicle portions and for securing one end of said piston rod to the other of said vehicle portions,
a conversion assembly which may be installed at will on said suspension assembly without requiring disassembly of said shock absorber other than temporarily disconnecting said last mentioned means, whereby to selectively convert said suspension assembly such that it is adjustable in response to pressurized fluid,
said conversion assembly comprising an elongated generally tubular flexible diaphragm member in part defining a variable volume gas chamber and including first and second attachment means,
said first attachment means comprising a portion adapted to be detachably connected adjacent said cylinder of said shock absorbing device and said second attachment means comprising a generally cup-shaped attachment fitting adapted to be detachably connected adjacent the outer end of said piston rod, and
means for selectively communicating pressurized gas to and from said chamber to effect expansion and contraction thereof.

23. The invention as set forth in claim 22 wherein said diaphragm is of a generally cylindrical configuration.

24. The invention as set forth in claim 22 wherein the vehicle for which said suspension strut is adapted for comprises an automotive vehicle having four rod engaging wheels.

25. The invention as set forth in claim 22 where upon assembly of said diaphragm onto said shock absorber, said lower end of said diaphragm is inversely folded into the interior of said diaphragm.

26. The invention as set forth in claim 22 wherein the upper end of said diaphragm extends around an axially downwardly extending side wall portion of an upper cup-shaped member and is sealingly engaged with said member.

27. The invention as set forth in claim 22 wherein said shock absorber is disposed within a tubular enclosure and one end of said diaphragm is attached to said enclosure.

28. A suspension system for vehicles having sprung and unsprung portions comprising,
at least one suspension assembly including a telescopic shock absorbing device having a cylinder and a reciprocal piston rod,
an elongated tubular housing adapted to nestingly receive said shock absorbing device, with one end of said housing having a threaded end portion,
means for securing one end of said cylinder to one of the vehicle portions and for securing one end of said piston rod to the other of said vehicle portions,
a conversion assembly for selectively converting said suspension assembly such that it is adjustable in response to pressurized fluid,
said suspension assembly comprising an elongated generally tubular flexible diaphragm member in part defining a variable volume gas chamber and including first and second attachment means,
said first attachment means comprising a threaded portion adapted to be threadably connected to said threaded portion of said housing and said second attachment means comprising a portion adapted to be detachably connected adjacent said piston rod, and
means for selectively communicating pressurized gas to and from said chamber to effect expansion and contraction thereof.

29. The invention as set forth in claim 28 which includes a fluid fitting on one of said attachment means for selectively communicating pressurized fluid to and from a variable volume chamber defined in part by said conversion assembly.

30. The invention as set forth in claim 29 wherein said fluid fitting is on said second attachment means.

31. The invention as set forth in claim 28 wherein said piston rod is formed with an axially extending bore adapted to communicate pressurized fluid from a source thereof to a variable volume chamber defined in part by said conversion assembly.

32. A conversion assembly for use with a suspension strut including a telescopic shock absorber having a cylinder and a reciprocal piston rod,
said assembly comrising an elongated generally tubular flexible diaphragm member and first and second attachment fittings adapted to be mounted adjacent the opposite ends thereof for fixedly securing one end of said diaphragm member to said cylinder and the opposite end of said member to said piston rod,
said second attachment fitting comprising a generally cup-shaped fitting adapted to be secured adjacent the outer end of said piston rod,
said attachment fittings being detachable connectable to said suspension strut whereby said diaphragm in part defines a variable volume gas chamber with said shock absorber, and
means for selectively communicating pressurized gas to and from said chamber to effect expansion and contraction thereof.

33. The invention as set forth in claim 32 wherein said diaphragm is of a generally cylindrical configuration.

34. The invention as set forth in claim 32 wherein the vehicle for which said suspension strut is adapted for comprises an automotive vehicle having four rod engaging wheels.

35. The invention as set forth in claim 32 where upon assembly of said diaphragm onto said shock absorber, said lower end of said diaphragm is inversely folded into the interior of said diaphragm.

36. The invention as set forth in claim 32 wherein said shock absorber is disposed within a tubular enclosure and one end of said diaphragm is attached to said enclosure.

37. The invention as set forth in claim 32 which includes a fluid fitting on one of said attachment fittings for selectively communicating pressurized fluid to and from a variable volume chamber defined in part by said conversion assembly.

38. A suspension system for vehicles having sprung and unsprung portions comprising,
at least one suspension strut including a telescopic shock absorbing device having a cylinder and a reciprocal piston rod,
an elongated tubular housing adapted to telescopically receive said cylinder of said device,
said housing having a threaded end portion,
means threadably engageable with said end portion for retaining said device within said housing,
means for securing one end of said cylinder to one of the vehicle portions and for securing one end of said piston rod to the other of said vehicle portions, a conversion assembly for selectively converting said strut such that it is adjustable in response to pressurized fluid, said assembly comprising an elongated generally tubular flexible diaphragm member in part defining a variable volume gas chamber and including first and second attachment means, said first attachment means being cooperable with said means for retaining said device within said housing and adapted to be connected adjacent said threaded portion of said housing, and said second attachment means comprising a portion adapted to be detachably connected adjacent said piston rod, and means for selectively communicating pressurized gas to and from said chamber to effect expansion and contraction thereof.

39. A conversion assembly for use with a suspension strut including an elongated tubular housing nestingly receiving a telescopic shock absorber having a cylinder and a reciprocal piston rod, said assembly comprising an elongated generally tubular flexible diaphragm member and first and second attachment fittings mounted on the opposite ends thereof for fixedly securing one end of said diaphragm member to said cylinder and the opposite end of said member to said piston rod, said attachment fittings being detachably connectable to said suspension strut whereby said diaphragm defines a variable volume gas chamber with said shock absorber, means for retaining said shock absorber within said housing and comprising a threaded end portion on said housing, and means for selectively communicating pressurized gas to and from said chamber to effect expansion and contraction thereof.

40. A conversion assembly for use with a suspension strut including a telescopic shock absorber having a cylinder and a reciprocal piston rod and mounted within an elongated tubular housing adapted to nestingly receive the shock absorber and having a threaded end portions, said assembly comprising an elongated generally tubular flexible diaphragm member and first and second attachment fittings mounted on the opposite ends thereof, said first attachment fitting adapted to be threadably connected to the housing end portion for fixedly securing one end of said diaphragm member to said housing and the opposite end of said member to said piston rod, said attachment fittings being detachably connectable to said suspension strut whereby said diaphragm in part defines a variable volume gas chamber with said shock absorber, and means for selectively communicating pressurized gas to and from said chamber to effect expansion and contraction thereof.

* * * * *

UNITED STATES PATENT AND TRADEMARK OFFICE
CERTIFICATE OF CORRECTION

PATENT NO. : 4,067,558
DATED : January 10, 1978
INVENTOR(S) : Johan H. Keijzer, Louis J. Jossa & Henri C. J. Vanhove It is certified that error appears in the above-identified patent and that said Letters Patent are hereby corrected as shown below:

Col. 1, line 18, after "been" delete "in";
Col. 1, line 65, "marked" should be --market--;

Col. 2, line 10, after "suspension" insert --with which the present invention is intended to be operably--;
Col. 2, line 56, after "absorber" insert --16--;
Col. 2, line 68, after "rod" the numeral "29" should be --20--;

Col. 3, line 11, "single" should be --simple--;
Col. 3, line 25, after "generally" insert --cylindrically--;

Col. 4, line 64, after "reworking" delete "or";

Claim 11, Col. 6, line 20, after "the" delete "second";

Claim 21, Col. 6, line 65, after "disposed" change "with" to --within--;

Claim 32, Col. 8, line 30, "detachable" should be --detachably--.

Signed and Sealed this

Twenty-seventh Day of June 1978

[SEAL]

Attest:

RUTH C. MASON
Attesting Officer

DONALD W. BANNER
Commissioner of Patents and Trademarks